United States Patent [19]

Demrick

[11] 4,213,226
[45] Jul. 22, 1980

[54] BUSHING AND GREASE RETAINER FOR CASTERS

[75] Inventor: Carl J. Demrick, Birmingham, Mich.

[73] Assignee: Herder, N.V., Curacao

[21] Appl. No.: 7,480

[22] Filed: Jan. 29, 1979

[51] Int. Cl.$^2$ ............................................. B60B 33/00
[52] U.S. Cl. .......................................... 16/36; 16/38; 16/43
[58] Field of Search ................ 16/18 R, 18 A, 30, 36, 16/37, 38, 39, 31 R, 31 A, 43

[56] References Cited

U.S. PATENT DOCUMENTS

| | | | |
|---|---|---|---|
| 959,108 | 5/1910 | Bent | 16/43 |
| 967,085 | 8/1910 | Turner | 16/36 |
| 2,973,546 | 3/1961 | Roche | 16/43 |

FOREIGN PATENT DOCUMENTS

| | | | |
|---|---|---|---|
| 1031516 | 5/1978 | Canada | 16/31 A |
| 1133609 | 11/1968 | United Kingdom | 16/38 |

*Primary Examiner*—George H. Krizmanich
*Attorney, Agent, or Firm*—McWilliams, Mann & Zummer

[57] ABSTRACT

This invention relates to a pivot bushing for casters and in which the stem for associating the caster with an article it is to support, is mounted. The bushing preferably is non-metallic and fits into the caster stem mount with a close fit for at least a portion of its depth with a clearance fit in the lower area where the stem must pass beyond an annular shoulder in the bushing for retention. The bushing has a fully closed lower end for retaining grease used to lubricate the stem for rotation in the bushing. The upper end of the bushing includes an integral cap-like enclosure, or shroud, which overlies the top end of the tube for mounting the bushing and stem in a caster and which lends a finished appearance in this area. A vertical exterior bead on one side of the bushing serves to engage a seam in the mounting tube to position the bushing properly relative to the caster.

5 Claims, 5 Drawing Figures

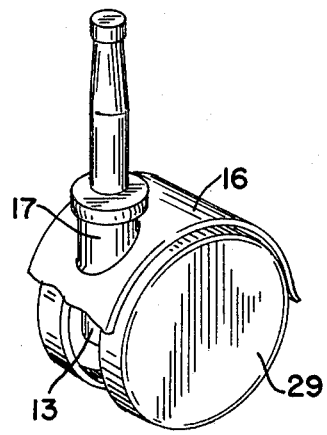
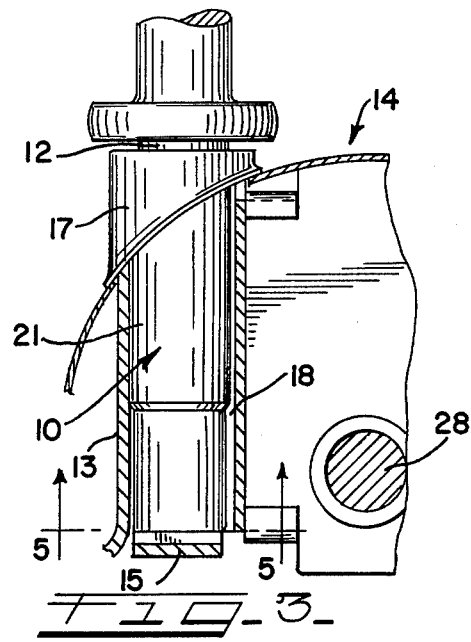
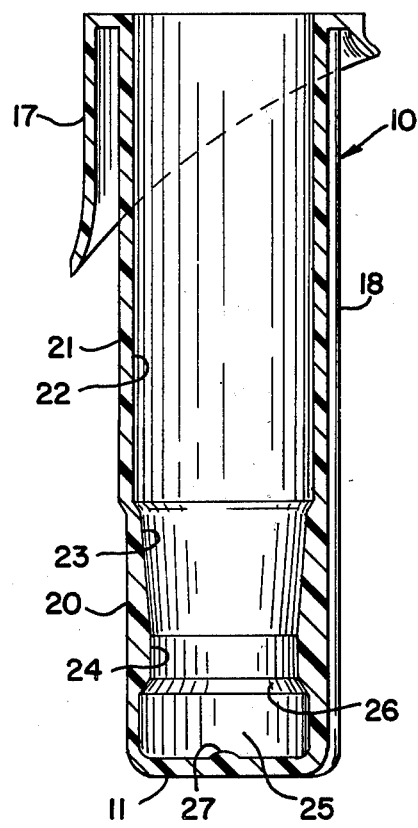
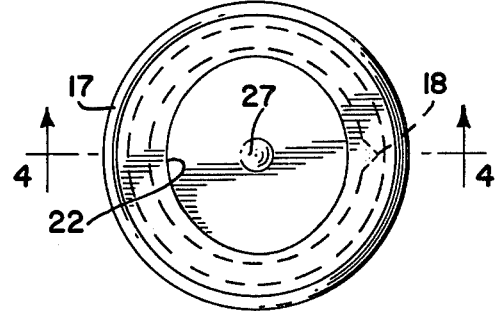
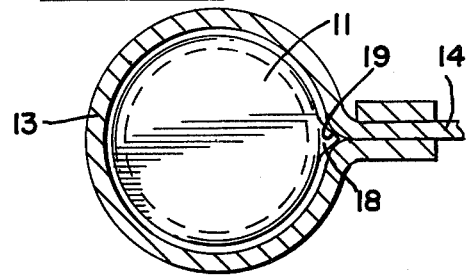

BUSHING AND GREASE RETAINER FOR CASTERS

BACKGROUND OF THE INVENTION

Heretofore, the pivot stem for mounting a caster relative to an article it is to support, has been mounted directly in a tubular receptacle in the caster, with a metal locking ring, or the like, for securing the stem in the receptacle. Frequently, the mounting receptacle was open at the bottom so that it was possible that grease used to lubricate the pivotal stem, could escape and create problems with respect to staining surfaces over which the caster operated. The escape of the lubricant had the effect also of causing the caster mounting to run dry and thus made the article on which the caster was mounted, difficult to move about.

In other mountings of this type the stem sometimes was rigidly secured in the caster structure and the stem then had to rotate in the socket adapted to receive the stem in an article of furniture, or the like, which was undesirable inasmuch as suitable bearing surfaces were not usually provided in such sockets, or a special socket had to be provided. In some prior devices where non-metallic casters were used the caster body structure was molded directly onto the lower end of the stem and again the stem had to rotate in the mounting socket in the furniture. In other prior casters the pivot stem was retained in the mounting bore merely by frictional engagement, either directly with the walls of the bore, or through a bushing but this type of retention was not sufficiently positive under all conditions and sometimes resulted in dropping a caster. Some of the prior caster arrangements utilized a bearing that functioned both as a thrust bearing and a pivot for the caster but this subjected the arrangement to greater stresses at the mounting and sometimes resulted in a loosening up of the pivotal connection with consequent unstable operation of the caster.

SUMMARY OF THE INVENTION

The present invention overcomes the deficiencies of prior art caster mounting arrangements by the provision of a combined, or integral bushing and grease retainer which includes a bottom thrust bearing as well. The combined unit also includes an integral shroud at its upper end which overlies and surrounds the top end of the mounting socket in the caster, so that a finished appearance is provided at this point concealing the upwardly projecting socket structure associated with the usual caster arrangement.

The bushing and grease retainer is generally cup-shaped and preferably made from a suitable plastic material, such as an acetal resin, but can also be made from certain metal materials, such as powdered metal, from which it could be molded. Sintered metal also might be utilized for the usual pivot shaft which, as illustrated herein, is typical of the type of such shaft that has become the norm in this field and for this purpose includes an upper bearing area which is of elliptical shape and a bottom thrust bearing with a locking collar, or shoulder, spaced from the thrust bearing area and merging with the upper bearing area by means of an upwardly tapering surface.

Between the locking shoulder and such upwardly tapering surface a generally cylindrical bearing surface is provided and on the outer side of the bushing at this point the outer wall, which is cylindrical, is of less diameter than at the upper portion of the bushing so that when the caster pivot shaft of the caster is inserted, this area of the bushing can be expanded within the caster socket to accommodate the passage of the shaft through this restricted area. At what might be termed the outer front side of the bushing, a vertically extending outwardly directed ridge, or bead, runs substantially full height of the bushing and is adapted to interengage with a vertical seam, or groove, in the caster socket to locate and fix the position of the bushing in the socket.

OBJECTS OF THE INVENTION

The primary purpose of this invention is to provide a bushing for a caster pivot shaft socket that improves the appearance of the caster and in one member combines the functions of a bushing and a grease retainer.

An important object of the invention is to provide a combined bushing and grease retainer made in one piece from a plastic material such as an acetal resin.

Another object of the invention is the provision of a plastic combination bushing and grease retainer for a caster pivot shaft including an interior locking restriction for such shaft and an exterior clearance area for expansion of the restriction to pass a portion of the shaft through the restriction.

A further object of the invention is to provide a one piece bushing and grease retainer having a shroud enclosing a portion of a caster socket mounting the bushing and having a vertical ridge on one side of the bushing engaging a recess in the socket to align the bushing and shroud for assembly with portions of the caster assembly.

A still further object of the invention is the provision of a combination bushing and grease retainer for a pivot shaft of a caster more specifically including a one piece bushing, adapted to fit in and enclose the socket that receives such pivot shaft in the caster, having a bottom thrust bearing surface, an upper elliptical bearing surface, a pivot shaft locking collar spaced above the thrust bearing with a concentric bearing surface rising from such collar and a tapering surface connecting the concentric bearing surface with the upper bearing surface.

DESCRIPTION OF THE DRAWINGS

The foregoing and other and more specific objects of the invention are attained by the construction and arrangement illustrated in the accompanying drawings, wherein FIG. 1 is a general perspective view of a caster equipped with the bushing of this invention with part broken away to show the two-wheel arrangement of the caster;

FIG. 2 is an enlarged scale view of a portion of the caster showing the socket structure with the bushing of this invention installed;

FIG. 3 is a top plan view of the bushing;

FIG. 4 is a vertical sectional view taken on the line 4—4 of FIG. 3; and

FIG. 5 is a cross sectional view on the line 5—5 of FIG. 2 with the bushing in the socket and showing the clearance at the bottom area of the bushing.

DESCRIPTION OF THE PREFERRED EMBODIMENT

In the drawings the combined bushing and grease retainer is shown at 10 and comprises a generally tubular structure made from a suitable plastic material such as an acetal resin. The bushing 10 is formed integrally in one piece and includes a closed bottom end 11 which, in addition to functioning as a means of retaining lubricating grease in the bushing, to prevent it from escaping, or draining onto a surface there beneath, also functions as a bottom thrust bearing for pivot shaft 12 when it is properly installed in the mounting socket 13 of a caster assembly 14. The caster socket 13 includes a bottom closure 15 against which the bottom wall 11 seats when the bushing 10 is installed in the caster.

The caster socket 13 extends above the surface of the caster top fender 16 and since the socket structure normally is of an unfinished appearance, its projecting portion would present an unsightly aspect if allowed to remain exposed. However, the bushing 10 includes a top shroud element 17 which extends over the top edge of the socket 13 and downwardly around the exposed socket portion and with its bottom edge closely contoured to the upper surface of the caster fender 16 to fit closely therewith and thereby fully enclose the projecting portion of the socket above the fender 16. The shroud 17 is flared outwardly around its lower edge to provide a better conforming fit with the fender 16 and to present a better appearance.

The bushing 10 is inserted into the caster socket 13 through the open top end thereof and is installed therein with the bottom wall 11 thereof supported on the bottom closure member 15 of the socket. The bushing includes means to insure proper positioning of the bushing in the socket in the form of a vertically extending ridge 18 running substantially the full height of the bushing and projecting outwardly from what might be called the front side of the bushing. This projecting ridge is disposed in a recess, or seam 19, which is created in the front side of the socket 13 when the integral body plate 20 is rebent upon itself around a forming member to create the socket. The seam 19 of course, extends substantially the full height of the socket 13 and with the ridge 18 extending full height of the bushing 10 and disposed in the seam the bushing is assured of being entered in the socket properly and is securely maintained against any possibility of rotating in the socket and the desired relationship of the shroud 17 with respect to the projecting portion of the socket 13 and to the curvature of the fender 16, is obtained immediately when the bushing is installed with the ridge 18 in the seam 19.

The lower portion of the bushing 10 is of smaller outside diameter, as at 20, than the upper portion 21 which is cylindrical on the outer side and which represents the major depth of the bushing and fits closely within the caster socket 13 and in engagement with the inner walls thereof. The smaller diameter 20 at the lower area, of course, provides clearance within the socket for a purpose that will hereinafter appear. In the area 21 of the bushing, the interior wall 22 provides a surface bearing for the pivot shaft 12 which is lubricated by a suitable grease in the socket and fully rotates therein as the article supported by the caster is moved about.

It will be noted from the plan view of the bushing 10 that interior bearing surface 22 is somewhat elliptical with the long dimension disposed laterally, even though the outer wall 21 is cylindrical for a proper close fit in the socket 13. This shape of the interior surface 22 is provided for the purpose of affording some lateral movement, or tilting of the pivot shaft 12 from side to side, inasmuch as the caster comprises a two wheel type and this type of caster requires some degree of this shaft movement in the normal operation of the caster, especially over uneven surfaces.

Below the bearing area 22, the bushing is formed with a tapering surface extending downwardly and inwardly, as at 23, to a concentric bearing surface 24, which extends downwardly to a bottom pocket 25 that receives a bottom head 26 on the lower end of the pivot shaft 12 that engages in the pocket beneath a shoulder 26 at the juncture of the pocket 25 with the concentric bearing surface 24. The passage of the relatively larger bottom head 26 on the pivot shaft 12 through the restricted area of the bearing 24 and shoulder 26, necessitates that the lower bushing area 20 must expand outwardly as the shaft head passes the restriction. The clearance in the socket 13 around the smaller diameter bottom portion 20 of the bushing is designed to accommodate this expansion and provide the clearance necessary to enable the head 26 to pass the restriction and enter the bottom pocket 25.

The thrust bearing surface 11 is provided with a raised center bearing 27 facing upwardly in the bottom pocket 25. This raised bearing is engaged first by the bottom surface of the head 26 on the pivot shaft 12 and insures that major thrust load, or weight, is applied at the center of the bottom thrust bearing. This load, of course, is supported at the bottom end of the caster socket 13, on the closure 15 and thence transferred to the caster body structure 14 and through the axle 28 to the caster wheels 29. The wheels 29 are disposed upon opposite sides of the caster body 14 so that with the body structure and socket 13 disposed midway between the wheels, the load is divided equally through the axle 28 to the respective wheels.

From the foregoing it will be seen that a one piece bushing of integral construction has been provided that incorporates the combined functions of a bushing and a grease retainer for a caster and which incorporates an upper shroud enclosure for concealing a portion of the caster structure. The bushing preferably is made from an acetal resin and is formed to provide an upper pivot shaft bearing, a bottom pocket including a locking shoulder for the shaft and a tapering surface merging with the shoulder and upper bearing area and which is cylindrical on the exterior to fit within a socket in the caster and having a portion expansible within the socket to permit passage of the pivot shaft past the shoulder.

What is claimed is:

1. A bushing and grease retainer for casters comprising a generally cup-shaped bushing having a closed bottom end, said bushing having a cylindrical outer wall, and an integral shroud extending radially outward at the top end of the bushing and downwardly around the bushing providing an enclosure adjacent said top end encircling a portion of the bushing, said cylindrical wall being of a major diameter for a major extent of the bushing, and a smaller diameter of said wall for a relatively lesser extent of the bushing adjacent said bottom end, an outer positioning bead extending vertically of the bushing as a projection from said cylindrical wall, an interior bearing surface provided throughout said major extent of the bushing, an interior pocket adjacent said bottom end, and an upwardly tapering surface extending between said pocket and said interior bearing surface.

2. A bushing and grease retainer as set forth in claim 1 wherein the outside diameter of the bushing area containing said interior pocket and said upwardly tapering surface is less than the outside diameter of said major extent of the bushing.

3. A bushing and grease retainer as set forth in claim 2 wherein the bushing is of integral construction made from a plastic material such as an acetal resin.

4. A bushing and grease retainer as set forth in claim 3 wherein the bottom of said shroud conforms to a curved surface on said caster, and a bottom edge on the shroud flared outwardly to provide a close fit with said surface.

5. A bushing and grease retainer as set forth in claim 1 wherein said interior pocket and said tapering surface are disposed in the area of said smaller diameter.

* * * * *